June 10, 1952  A. R. COVIELLO  2,600,359
REVERSIBLE PLOW

Filed April 6, 1948  3 Sheets-Sheet 1

INVENTOR:
ANTHONY R. COVIELLO.
BY
*Huebner, Malthy & Beehler*
ATTORNEYS.

June 10, 1952  A. R. COVIELLO  2,600,359
REVERSIBLE PLOW
Filed April 6, 1948  3 Sheets-Sheet 2
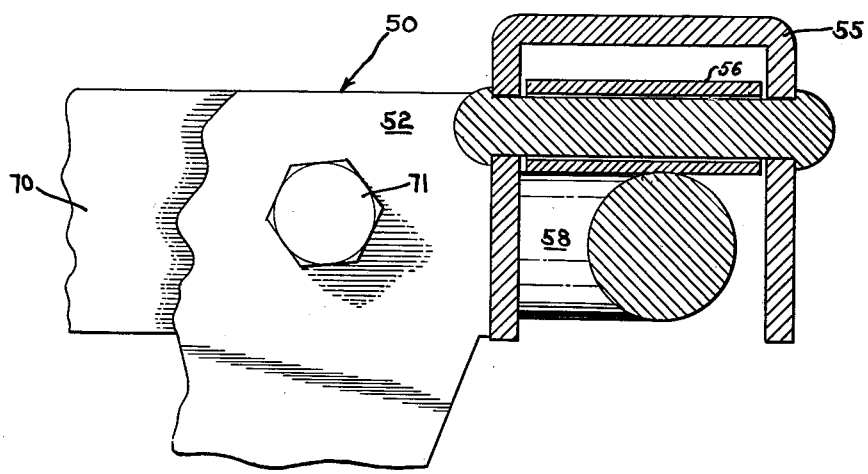
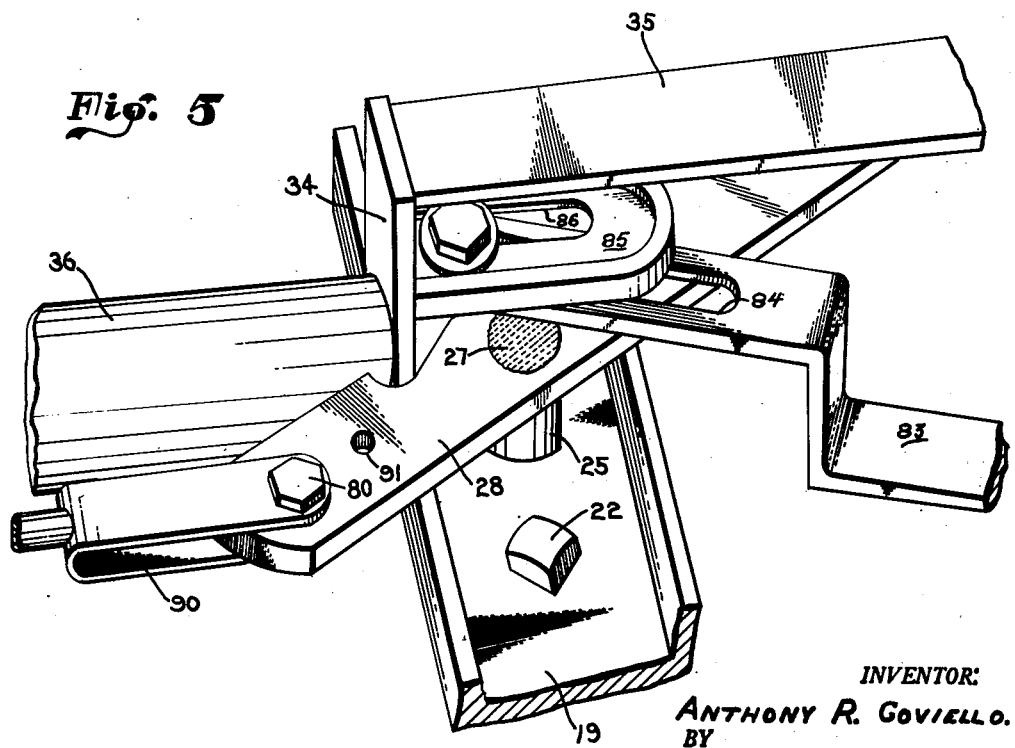
INVENTOR:
ANTHONY R. COVIELLO.
BY
ATTORNEYS.

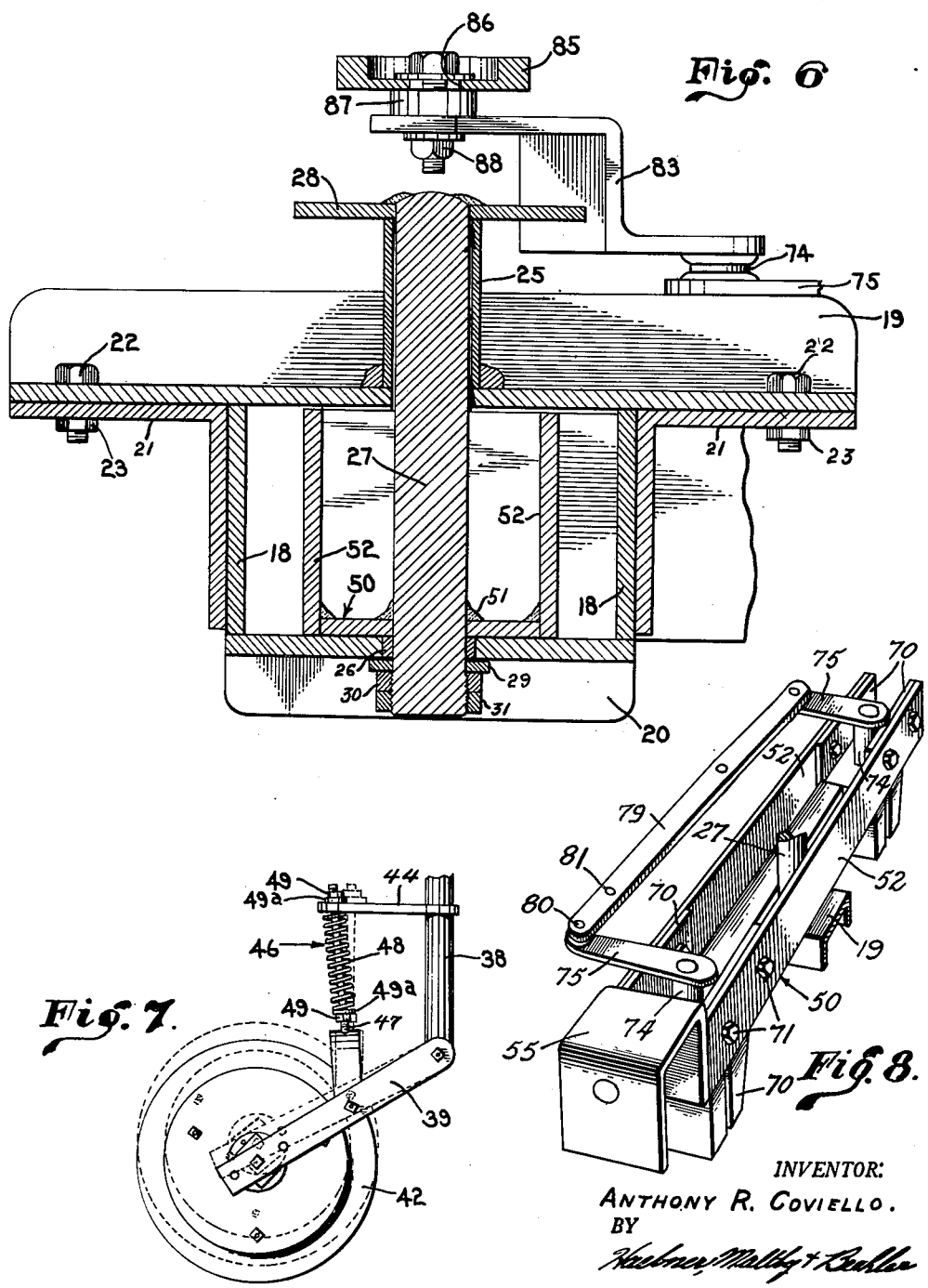

Patented June 10, 1952

2,600,359

UNITED STATES PATENT OFFICE 2,600,359

REVERSIBLE PLOW

Anthony R. Coviello, Tulare, Calif.

Application April 6, 1948, Serial No. 19,266

9 Claims. (Cl. 97—32)

The present invention relates to plows and more particularly to improvements in a disc plow of the general type described in my United States Patent No. 2,084,629 which includes a gang of plow discs which is reciprocally positionable between opposite sides of the plow and a linkage which reverses the attitudes of the discs during such positioning so as to discharge encountered earth laterally to opposite sides of the plow.

The advantages of reversible plows are well known and are briefly illustrated in the plowing of a field so as to throw plowed earth in a single direction while the plow is caused to traverse reciprocal parallel paths. For example, when the plow is drawn in one direction encountered earth is discharged to a side thereof. When the plow is drawn in the opposite direction encountered earth is discharged to the opposite side of the plow by reversing the plow discs in the plow and thus the plowed earth is discharged in relation to the field in the same direction. This avoids the formation of undesirable ridges and furrows in the field characteristic of non-reversible plow operation.

Reversible plows have been subject to certain difficulties which the present invention seeks to overcome. Such plows tend to drift laterally as a result of lateral thrust of the plow discs in earth engagement. This makes directional control, accuracy of depth control, and uniformity of cultivation difficult to achieve. Difficulty has been experienced in reversing the plow discs in the plow at the end of the furrow which operation requires excessive effort on the part of the operator and waste of time. Such plows have been characteristically difficult to adapt to varied soil and operational requirements.

An object of the present invention therefore is to provide an improved reversible plow.

Another object is to provide a two-way plow conveniently and easily adapted to varied soil and operational requirements.

Another object is to maintain earth working tools employed in reversible plows in accurately predetermined attitudes to the end of effecting substantially constant extent of earth engagement thereby.

Another object is to compensate for lateral, plow-disc, thrust in plows of the type described.

Another object is to provide a reversible plow embodying improved control means.

Another object is to provide a reversible plow employing reciprocally positionable plow blades arranged in a pivotally mounted plow beam whereby the plow blades exert substantially equal and opposite turning moments on the beam.

Other objects and advantages will become apparent in the subsequent description in the specification.

In the drawings:

Fig. 4 is a fragmentary section taken on line 4—4 of Fig. 2.

Fig. 5 is a somewhat enlarged fragmentary view of a control arm, positioning lever, guide member, and elements employed therewith in the plow of the present invention.

Fig. 6 is a somewhat enlarged section taken on line 6—6 of Fig. 1.

Fig. 7 is an enlarged side elevation of the rudder wheel employed in the reversible plow shown in Fig. 1.

Fig. 8 is a perspective view of a plow beam employed in the device of the present invention showing certain associated parts and their relation thereto.

Figure 1:
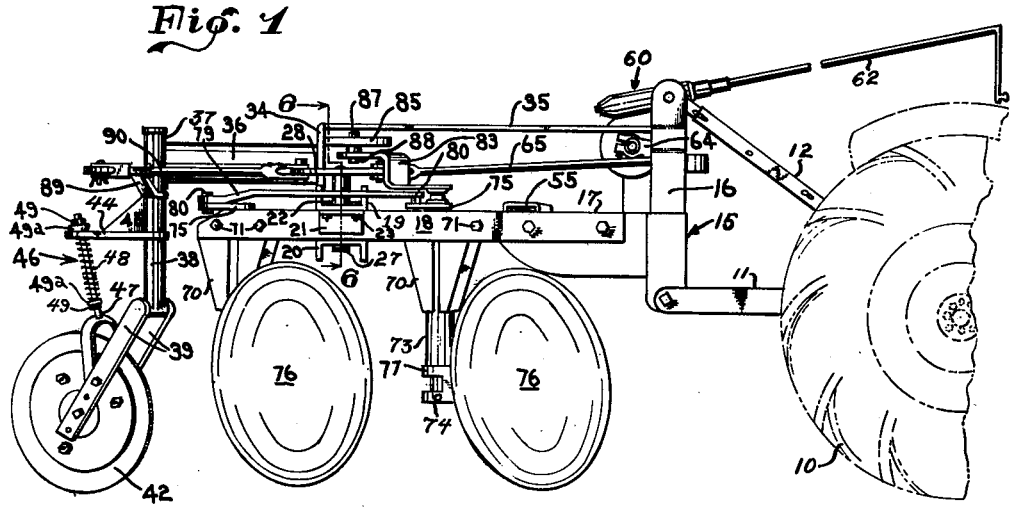
Fig. 1 is a side elevation of a reversible plow embodying the principles of the present invention and a fragmentarily illustrated tractor shown in drawing relation thereto.

Referring in greater detail to the drawings:

A tractor 10 is fragmentarily illustrated in Fig. 1 characteristic of draft appliances generally. The tractor employs hydraulically elevated tool mounting arms 11 and 12, respectively, that are hydraulically raised and lowered to raise and lower agricultural implements connected thereto. Such mounting arms are well known in the art and are not described in greater detail at this point. Further, the device of the present invention is not limited to use with tractors employing hydraulic lifts but is suitably employed with any draft appliance furnishing the requisite power.

Figure 2:
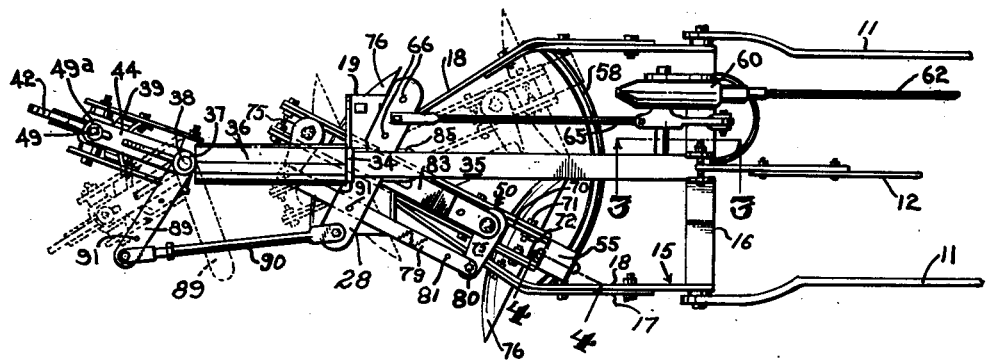
Fig. 2 is a plan view of the plow shown in Fig. 1.
Figure 3:
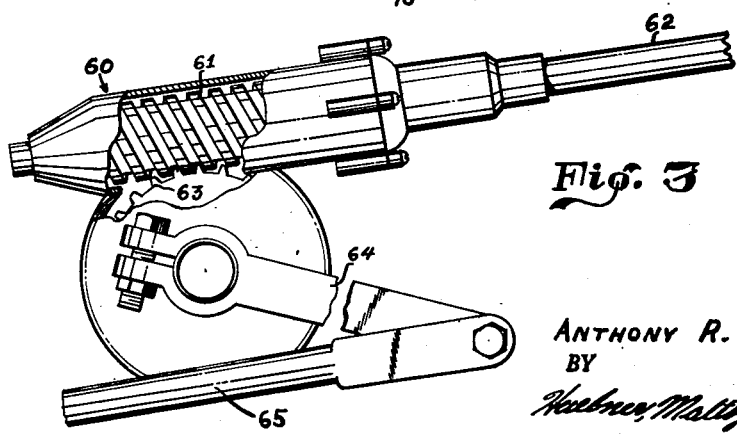
Fig. 3 is a somewhat enlarged fragmentary view of a portion of a manual control means of the present invention, as seen from line 3—3 in Fig. 2.

In Figs. 1 and 2, a forwardly movable draft frame is indicated generally at 15 having a forward end portion 16 transversely of the well known A frame structure adapted for connection to the mounting arms 11 and 12. Rearwardly extended from the forward end portion of the frame are spaced, substantially parallel side bars 17 which are interconnected by rearwardly and inwardly extended bars 18. An upwardly disposed channel iron brace 19 is secured transversely to the draft frame to the rearwardly and inwardly extended bars 18 near the juncture of their rearward end portions. A downwardly disposed channel iron brace 20 is secured, also transversely to the plow, to said rearwardly and inwardly extended bars below the brace 19. The lower brace 20 is conveniently mounted as by welding to said bars 18. To mount the upper brace 19, angle brackets 21 are weldably secured to the rearwardly and inwardly extended bars 18 and said upper brace secured to the brackets as by bolts 22 and nuts 23. Although the draft frame is shown in a form suitable for fabrication from properly configurated bars, channel iron, and the like as by bolting and welding the same together; it will be readily apparent that the frame may be of unitary construction, and formed by casting, stamping, welding, or any other suitable system of formation.

A tubular bearing sleeve 25 is mounted in a substantially erect position on the upper brace 19, as shown in Fig. 6, as by being welded thereto. A bearing sleeve 26 is provided in the lower brace 20 in alignment with the upper sleeve 25 and a bore formed through the upper brace 19 in alignment with the sleeves. The bearing sleeves are preferably substantially laterally centered in the frame.

A pivot post 27 is journaled in the sleeve 25. A control arm 28 is welded to the upwardly extended end portion of the post and in abutment with the upper end of the sleeve 25, constituting a bearing stop precluding the dropping of the post from the sleeve. A thrust washer 29 is positioned on the post below the brace 20 and a securing nut 30 and jamb nut 31 employed to secure the post in the frame 15, as shown.

The draft frame 15 is rearwardly extended by welding a plate 34 on the upper brace 19 in a substantially erect position and interconnecting the upper end of the plate 34 with the A frame 16 by a strut 35. A tubular bracket 36 is rearwardly extended from the plate in alignment with the normal direction of movement of the draft frame. A rudder mounting bearing 37 is mounted on the rearward portion of the tubular bracket 36 in a substantially erect position, as by welding. A rudder yoke 38 is journaled in the sleeve and provides a pair of downwardly and rearwardly directed legs 39 pivotally mounted thereon. The legs constitute a bifurcated portion of the yoke. A rudder member 42, conveniently of the form of a plow colter, is journaled in the bifurcated portion of the yoke. A depth control bracket 44 is welded on the yoke in a position in substantial alignment with the rudder member. The bracket 44 is preferably braced by a gusset plate 45 welded thereto and to the yoke. A spring loaded depth control member 46 is interconnected between the rearwardly extended end portion of the bracket 44 and the legs 39 of the yoke. The depth control member is conveniently formed of a screw-threaded shaft 47 slideably received in the rearward end portion of the bracket 44 and has a bifurcated lower end portion pivotally connected to the legs 39. A helical compression spring 48 is mounted in circumscribing relation to the shaft 47 below the bracket 44. A pair of adjustment nuts 49 are screw-threadably engaged to the shaft, one thereof above the bracket 44 and in abutment therewith and the other thereof below the spring 48. Manipulation of the nut 49 in association with the bracket 44 serves elevationally to adjust the rudder member 42. Adjustable positioning of the lower nut 49 in abutting relation to the spring 48 serves to regulate the force exerted by the spring in holding the legs 39 in their downwardly directed positions as determined by adjustment of the upper nut. Manipulation of the nuts 49 is facilitated by washers 49a interposed between said nuts and their respective abutted elements. Adjustment of the nuts serves elevationally to position the rudder member relative to the frame and thus to control the depth of earth engagement of the rudder member and its effect, and to control the shock absorbing characteristics of the spring which serves to protect the structure of the draft frame and rudder mounting when the device is dropped to earth engagement and when the rudder member 42 encounters obstructions in the soil such as rocks and the like.

A plow beam 50 is pivotally mounted intermediate its end portions for substantially horizontal pivotal movement between attitudes oppositely angled from alignment with the normal direction of movement of the plow by being weldably secured to the pivot post 27, as at 51 in Fig. 6. The plow beam conveniently takes the form of a pair of angle iron sides 52 arranged in substantially parallel relation oppositely disposed to the post, as most clearly shown in Fig. 8. An inverted U shaped bracket 55 is mounted at the forward end portion of the plow beam, as by welding, and forwardly extended. A roller 56 is journaled in the U shaped bracket in substantial alignment with the plow beam, as shown in Fig. 4. An arcuate track 58 concentrically disposed to the pivot post 27 is mounted in the frame in supporting relation to the roller 56 and thus the plow beam 50. The track serves accurately to maintain the forward end portion of the plow beam at constant elevation as it is reciprocally angled in the frame and reduces strain imposed on the pivot post 27 and bearing sleeves 25 and 26.

Being in fixed radial relation to the post 27, the control arm 28 is in controlling relation to the plow beam 50. For convenience in positioning the plow beam, a worm drive control 60 is fixedly mounted on the forward end portion of the draft frame 15. The control employs a worm gear 61 having driven connection with a manually manipulable crank 62 forwardly extended from the control to a position conveniently accessible by an operator of the tractor 10. The worm gear engages a pinion 63 journaled in the control 60 which is in unitary relation with a radially extended arm 64. A push-pull rod 65 interconnects the radially extended end of the arm 64 and the control arm 28 at a point removed from the pivot post 27. Thus by rotation of the crank 62 an operator may conveniently, adjustably angle the plow beam 50 in the draft frame 15. The mechanical advantage exerted by the operator through the crank 62 is readily adjusted by providing a plurality of control arm engaging positions 66 for the push-pull rod 65. It will readily be apparent that the manually manipulable control system for the control arm 28 just described, is merely a suitable form of control to which the present invention is in no way limited. The control arm, for example, may conveniently be manipulated by hydraulic control means, by a lever extended therefrom, or by any other suitable structure.

A pair of pillow blocks 70 are mounted in the plow beam 50 as by bolts 71 and nuts 72 engaged to the sides 52 thereof. The pillow blocks in turn mount bearings 73 in substantially erect positions. The pillow blocks 70 are preferably arranged in the plow beam, so as to space the bearings 73 substantially equally and oppositely from the pivot post 27. Tool posts 74 are mounted in the bearings 73 and rotatably positioned therein by positioning arms 75 radially extended from the posts above the bearings. Plow disc blades 76 are fixedly mounted on the lower end portions of the tool posts 74, as by disc mounting brackets 77. The plow disc blades are mounted in attitudes adapted for earth engagement and are pivotally positioned between attitudes adapted to discharge the earth encountered in a direction having a lateral component of movement to the right of the plow and attitudes adapted to discharge earth encountered in a direction having a lateral component of movement to the left of the plow. A push-pull member 79 interconnects the radially extended ends of the positioning arms 75 in predetermined spaced relation. The push-pull member is conveniently connected to the positioning arms as by pins 80. To the end of providing relative adjustable angling of the plow blades, the push-pull member 79 is provided with a plurality of pin receiving openings 81 for selective connection to the positioning arms. The push-pull member results in corresponding variations in the attitude of a plow disc blade upon movement of the other of the blades.

To the end of translating reciprocal positioning of the plow beam 50 into controlled angling of the plow blades 78, a lever 83 is welded to the forward tool post and rearwardly extended therefrom. Thus it will be seen that the tool post 74, its positioning arm 75, and the lever 83 are rigidly interconnected. The lever provides a slot 84 formed longitudinally therein in substantial radial relation to the post. A guide 85 having a camway 86 formed therein in substantial longitudinal alignment with the draft frame, is mounted in the frame adjacent to the lever 83, as shown in Fig. 5. A cam or cam follower 87 is positioned in the slot 84 of the lever 83 and secured in longitudinally adjusted position in the slot by a jamb nut 88. The cam is upwardly extended through the guide member in engagement with the camway. The significance of the arrangement described and the rearward extension of the lever 83 is made clearly apparent by reference to Fig. 2. When the control means 60 is manipulated to angle the plow beam as shown in full lines in Fig. 2, the lever, through the riding of its cam 87 in the camway 86, angles the plow blades in response thereto. Thus when the forward end portion of the plow beam is angled to the right, the plow blades 76 are also angled to the right. When the control 60 is manipulated to angle the plow beam to the left, as shown in dotted lines, the plow blades are responsively angled to the left. The extent of the angling of the plow blades in response to a given angling of the plow beam is readily adjustable through the adjustable positioning of the cam 87 in the slot 84.

A tiller 89 is radially extended from the rudder yoke 38. A telescopically adjustable push-pull rod 90 is interconnected between the control arm 28 and the tiller on the same side of the rudder yoke and pivot post 27 respectively. The tiller and the control arm preferably provide optional engaging positions 91 for the push-pull rod. The connection of the push-pull rod between the control arm and the tiller as described, translates pivotal positioning of the plow beam 50 into corresponding directional, pivotal positioning of the rudder member 42. Telescopic adjustment of the push-pull rod controls relative positioning of the rudder member and the control arm, and the positions at which said rod is connected to the control arm and the tiller, control the mechanical advantage of the control arm in relation to the tiller and the extent of the rudder member angling in response to a given plow beam angling.

*Operation*

The operation of the reversible plow of the present invention is clearly apparent and is briefly summarized at this point. To precondition the plow for operation the mounting arms 11 and 12 of the tractor are preferably elevated to raise the plow blades 76 and the rudder member 42 from earth engagement. When a tractor is employed that does not have an hydraulic lift, the plow is preconditioned for operation while in earth engagement. The control 60 is manipulated to position the plow beam 50 for the discharge of earth to the side of the plow desired. Such positioning of the beam results in an angling of the plow blades 76 to positions predetermined by the positioning of the cam 87 in the slot 84. Simultaneously the rudder member 42 is angled in the same general direction as the plow beam, as previously described. The mounting arms 11 and 12 are lowered to bring the blades 76 and rudder member 42 into earth engagement and the plow caused to traverse the earth desired to be plowed.

As earth is urged laterally by the plow blades 76 the earth urges the draft frame 15 in the opposite direction. The angling of the rudder member 42 in earth engagement compensates for this lateral thrust of the blades. Obviously the rudder member may be caused to overcontrol or undercontrol depending upon the adjustment and mounting of the push-pull rod 90. As shown in Fig. 2, the rudder member rides in the furrow of the rearward plow disc and thus is engaged with relatively firm earth and does not molest earth discharged by the plow blades. The positioning of the rudder member at the rear of the draft frame 15 gives the forces exerted thereby a mechanical advantage over the forces exerted on the plow blades by encountered earth.

The mounting of the plow blades 76 substantially equally and oppositely disposed to the pivot post 27, causes their turning moments exerted on the plow beam 50 to be substantially equal and opposite. This has been found conducive to operational accuracy and ease of control. These equal and opposite turning moments tend to maintain the plow in adjusted position in the draft frame and to eliminate crawling of the plow beam from adjusted position during operation, as experienced in conventional plows of the type. It will be clearly evident that the present invention is not limited to the employment of a pair of plow blades nor to equal and opposite spacing of the blades.

When the plow reaches the end of a furrow and it is desired to reverse the direction of movement thereof, the plow is elevated from the earth by manipulation of the mounting arms 11 and 12 and the control 60 manipulated to angle the plow beam in the opposite direction resulting in a corresponding opposite angling of the rudder member 42 and plow blades 76 from the positions previously maintained. The plow is lowered into earth engagement and the plowing operation repeated.

The device of the present invention is conveniently adjusted and operated. Its simplicity of structure is conducive to economy of construction and operation.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and apparatus.

Having described my invention, what I claim as new and desire to secure by Letters Patent is:

1. In a reversible plow, the combination of a draft frame having means for connection to a draft appliance, a plow beam pivotally mounted in the draft frame for pivotal movement in a substantially horizontal plane, plow members borne by the plow beam on opposite sides of the pivotal mounting, a rudder member swivelly mounted in the draft frame in earth engagement, control means connected to the plow beam pivotally positioning said beam relative to the draft frame, and means having controlled connection to the plow beam and controlling connection to the rudder member and swivelly positioning the rudder member relative to the frame in response to pivotal movement of the plow beam in the frame and in the same direction.

2. In a reversible plow having a forwardly movable draft frame, a plow beam mounted in the frame for substantially horizontal pivotal movement, disc plow blades pivotally mounted in the beam, and means interconnecting the plow blades for corresponding pivotal movement in the beam; the combination of a substantially horizontal guide mounted in the frame having an enlongated cam way formed therein longitudinally of the frame, a lever radially extended from a plow blade in pivotal controlling relation thereto to a position in elevationally spaced relation to the guide, and a cam follower mounted on the lever in predetermined radially spaced relation to the center of pivotal movement of the plow blade and slidably engaged in the cam way of the guide.

3. A reversible disc plow comprising a draft frame having forward and rearward end portions, means mounted at the forward end of the frame adapted for connection to a draft appliance, direction control means swivelly mounted in supporting relation to the rearward end of the frame, a plow beam mounted in the frame for horizontal pivotal movement, a disc plow blade rotatably mounted in the plow beam forward of the pivotal mounting thereof, a guide rigidly mounted in the frame having a cam way formed therein forwardly and rearwardly extended from vertical alignment with the pivotal mounting of the plow beam, a lever radially extended from the disc plow blade rearwardly in the frame and having a longitudinal slot formed therein adjacent to the guide, a cam follower mounted in the slot of the lever for radial adjustment relative to the rotatable mounting of the disc blade in engagement with the cam way of the guide, and means interconnecting the plow beam and the direction control means and translating pivotal movement of the beam in the frame into corresponding pivotal movement of the direction control means in the frame.

4. In a reversible plow, the combination of a forwardly movable drift frame, a beam pivotally mounted in the draft frame for substantially horizontal pivotal movement about a pivot axis intermediate its ends, disc plow blades mounted on the beam on opposite sides of the pivot axis of said beam for reciprocal positioning between attitudes adapted to work the earth in a direction having a lateral component to one side of the plow and attitudes adapted to work the earth in a direction having a lateral component to the opposite side of the plow, means interconnecting the plow blades for pivotal movement in corresponding directions, a lever rearwardly extended from a disc blade in radial relation to the pivotal mounting thereof, a guide mounted in the draft frame adjacent to the lever, a cam borne by the lever in engagement with the guide whereby positioning of the beam in the draft frame is translated into responsive positioning of the plow blades on the beam, a rudder member swivelly mounted in the rearward end portion of the draft frame, and means interconnecting the beam and the rudder member for corresponding pivotal movement relative to the draft frame.

5. A reversible disc plow comprising a draft frame, an elongated plow beam, a substantially erect shaft mounted in the frame and pivotally mounting the plow beam intermediate its ends for substantially horizontal pivotal movement in the frame, a plurality of tool posts rotatably mounted in the plow beam on opposite sides of the shaft and downwardly extended from the beam, disc blades mounted on the posts in substantially erect positions, arms radially extended from the tool posts, a push-pull member pivotally interconnecting the radially extended arms, means mounted on the frame for controllably angling the plow beam in the frame, a guide rigidly mounted in the frame extended above the shaft and having an elongated cam way formed therein transversely disposed to the shaft, a lever radially extended from a tool post to a position adjacent to the guide, and a cam follower mounted on the lever in controlled engagement with the cam way of the guide.

6. A reversible disc plow comprising a draft frame having forward and rearward end portions, an elongated plow beam, a substantially erect shaft mounted in the frame and pivotally mounting the plow beam substantially at the mid-portion thereof for horizontal pivotal movement in the frame, a pair of tool posts rotatably mounted in the plow beam on opposite sides of the shaft and downwardly extended from the beam, a disc blade mounted on each of the posts in corresponding substantially erect positions, an arm radially extended from each of the tool posts laterally of the elongated beam, a push-pull member pivotally interconnecting the radially extended arms for corresponding movement of their respective posts, a control arm rigidly mounted transversely on the shaft, means mounted in the frame connected to the control arm adapted controllably to position the control arm shaft and plow beam in the frame, a guide rigidly mounted in the frame and extended above the shaft, said guide having an elongated camway formed therein transversely of the shaft, a lever radially extended from a tool post to a position adjacent to the guide, a cam follower mounted on the lever in controlled engagement with the camway of the guide, a rudder wheel, a rudder yoke swivelly mounting the rudder wheel in the rearward end portion of the frame, a tiller radially extended from the yoke laterally of the frame, and a push-pull rod pivotally interconnecting the control arm and the tiller for corresponding movement.

7. In a reversible plow, the combination of a draft frame having means for connection to a draft appliance, a plow beam pivotally mounted in the draft frame for pivotal movement in a substantially horizontal plane, plow members borne by the plow beam on opposite sides of the pivotal mounting and substantially equally spaced from said mounting, a rudder member swivelly mounted in the draft frame in earth engagement, control means connected to the plow beam pivotally positioning said beam relative to the draft frame, a control arm mounted on the beam and extended therefrom in radial relation to the pivotal movement thereof, a tiller mounted on the rudder member and extended therefrom in radial relation to the swivel movement thereof, and a push-pull rod pivotally interconnecting the control arm and tiller for corresponding pivotal movements.

8. In a reversible plow having a forwardly movable draft frame, a plow beam mounted in the frame for substantially horizontal pivotal movement, disc plow blades pivotally mounted in the beam, and means interconnecting the plow blades for corresponding pivotal movement in the beam; the combination of a substantially horizontal guide mounted in the frame having an elongated cam way formed therein longitudinally of the frame, an elongated lever radially extended from a plow blade in pivotal controlling relation thereto to a position in elevationally spaced relation to the guide, said lever having a slot formed longitudinally thereof, a cam follower slidably engaged in the cam way of the guide, and means rigidly mounting the follower in the slot of the lever in adjustable radially spaced relation to the center of pivotal movement of the plow blade.

9. In a reversible plow, the combination of a draft frame having forward and rearward end portions, ground engaging direction control means swivelly mounted in supporting relation to the rearward end of the frame, a plow beam pivotally mounted in the draft frame for pivotal movement in a substantially horizontal plane, disc plow blades mounted on the beam for reciprocal positioning between attitudes adapted to work the earth in a direction having a lateral component to one side of the plow and attitudes adapted to work the earth in a direction having a lateral component to the opposite side of the plow, means interconnecting the plow blades for corresponding reciprocal positioning, control means interconnecting the disc blades and the frame and translating pivotal movement of the plow beam from side to side in the frame into positioning of the plow blades to work the earth in a direction having a lateral component to the corresponding side of the frame, and means interconnecting the plow beam and the direction control means and translating pivotal movement of the plow beam in the frame into corresponding pivotal movement of the direction control means from side to side in the frame.

ANTHONY R. COVIELLO.

REFERENCES CITED

The following references are of record in the file of this patent:

UNITED STATES PATENTS

| Number | Name | Date |
|---|---|---|
| 659,748 | Hill | Oct. 16, 1900 |
| 918,841 | Freeman | Apr. 20, 1909 |
| 954,950 | Fowler | Apr. 12, 1910 |
| 1,127,179 | Brown | Feb. 2, 1915 |

FOREIGN PATENTS

| Number | Country | Date |
|---|---|---|
| 11,949 | Germany | Dec. 9, 1880 |
| 110,313 | Germany | Apr. 27, 1900 |